J. HITCHINGS.
SEEDER.
APPLICATION FILED SEPT. 9, 1908.
924,228.
Patented June 8, 1909.
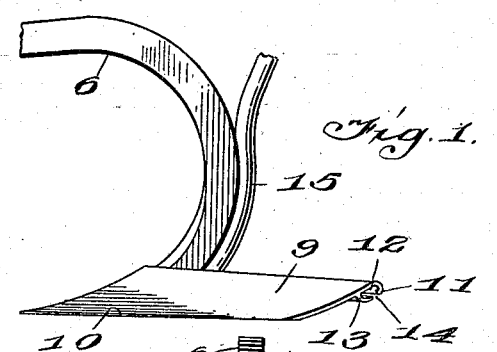
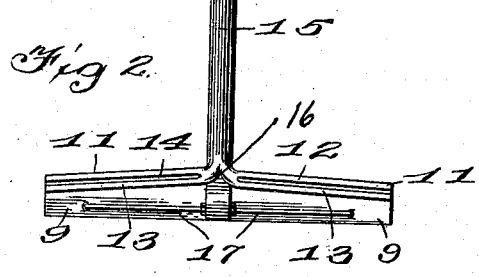
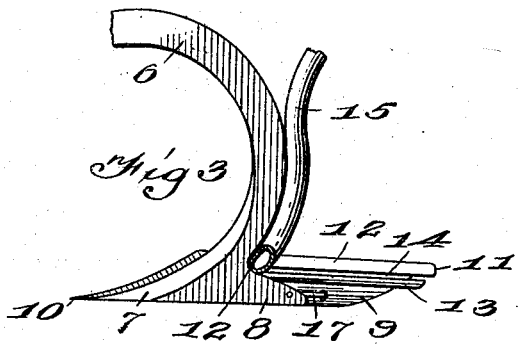
Inventor
James Hitchings

UNITED STATES PATENT OFFICE.

JAMES HITCHINGS, OF INGALLS, KANSAS.

SEEDER.

No. 924,228.  Specification of Letters Patent.  Patented June 8, 1909.

Application filed September 9, 1908. Serial No. 452,261.

*To all whom it may concern:*

Be it known that I, JAMES HITCHINGS, citizen of the United States, residing at Ingalls, in the county of Gray and State of Kansas, have invented certain new and useful Improvements in Seeders, of which the following is a specification.

This invention relates to seeders and planters, and has for its principal object to provide a seeder which will sow or plant the seed without the necessity for plowing the ground or turning the sod.

The seeder comprises a blade or share which is constructed in such manner that it will pass under and lift a few inches of the soil, which will drop over the rear edge of the share and will cover seed which is fed down through or behind the share and which drops behind or under the same.

The implement is intended to put the grain or seed under the sod without turning the same, and consequently it may be used to plant one crop under another. For example, it may plant a grain crop under a forage crop, sowed expressly for fertilizing purposes or otherwise. The implement will act to cut the roots of the forage or upper crop, and will deposit the wheat or other lower crop, and the latter will thereby be protected from drought, and will not be uncovered or blown bare by wind storms. This manner or method of seeding will be found particularly useful in dry territory, as it will plant deep. For example, it will seed under a large growth of weeds, or sugar cane, or broom corn, or buckwheat, any of which can be left on the ground, to protect the wheat or other winter crop so seeded, and the upper crop or material will rot and so act as a fertilizer and also conserve moisture and so assist the germination and growth of the later crop.

The action of the implement, as mentioned above, is to cut a slice under the surface of the ground and to deposit the seed under the said slice which slides or falls over the share and onto the seed.

The invention is illustrated in the accompanying drawings in which—

Figure 1 is a side elevation of the implement; Fig. 2 is a rear elevation; Fig. 3 is a central vertical section; Fig. 4 is a vertical section of one side of the share or blade.

The implement may be used singly, or in a gang attached to a suitable frame. The curved standard or stem 6 of the implement terminates in a point 7 which may have a heel or foot-piece 8 to cause the share to run level. The share consists of two wings 9 extending substantially horizontally from each side of the stem or standard. Each side comprises a plate which is sharpened at the front edge, as at 10, and inclines upwardly and backwardly therefrom at a slight inclination, the purpose and result being to cut a slice a few inches under the surface of the soil and to lift the same slightly. The stem 6 is made narrow from front to rear, so that the surface of the soil is disturbed as little as possible.

The rear edge of each plate or blade 9 is curved downwardly and forwardly, as indicated at 11, forming the upper or rear side of a tube 12 which extends along behind the upper edge of the blade, the other side of the tube being formed by a lip 13 projecting from the rear or under side of the blade. A slit 14 is produced between the edges of the parts 11 and 13, and the grain escapes through this slit. This construction forms, in effect, a slotted tube under the rear edge of the blade, inclined outwardly and slightly downwardly, and serving to conduct the seed.

The seed is fed through a tube 15 which extends down behind the stem, and the seed may be dropped into said tube from any appropriate seed box or device suitable for the purpose. In falling through said tube the seed will strike the stop or inclined part 16 at the bottom thereof, and at the inner ends of the tubes 12, and will roll a greater or less distance out in said tubes 12 before dropping therefrom through the slots 14. The uncertain or variable action of the seed in this respect will give a broad row or broadcast effect, and by making the wings or plates 9 long enough, a row of any desired width, within reason, may be sowed. The side plates or wings 9 are strengthened by braces 17 projecting laterally on each side from the foot of the stem 6.

In sowing unplowed ground or ground covered with a standing crop of forage or other stuff, this planter will be run a few inches under the surface of the soil, thereby cutting off the roots of the standing stuff, and at the same time lifting a slice of earth, which will be otherwise substantially undisturbed, and the seed for the desired crop will be fed down and out through the leg 15 and the side tubes 12 and will find its way out behind the share and will be covered when the slice of the soil falls into place behind the rear edge of the blade 9. The roots and tops of the old crop will gather moisture and also protect the soil. Forage crops may be mowed and removed before the seeder is used, and then a crop of winter wheat, say, run in under the stubble, without plowing.

The invention is not limited to the exact structure shown, and various modifications may be made within the scope of the following claims.

I claim:

1. A seeder having a feed chute, and a blade extending laterally and substantially horizontally therefrom and adapted to cut under a slice of the soil, and having a seed passage with outlets, under the rear part thereof, communicating with said chute.

2. A seeder comprising a stem, blades extending laterally therefrom and presented horizontally with the cutting edge in front to cut a slice of the soil, said blades having seed tubes with outlets extending along on the under side thereof, and means to feed seed to said tubes.

3. A seeder having a horizontal blade with a cutting edge at the front and a seed tube extending along under the rear edge and having outlets for the seed.

4. A seeder comprising a stem, a feed chute beside the same, blades extending laterally and substantially horizontally from the stem, the blades being inclined slightly downwardly and forwardly, to cut and lift a slice of the soil, and having seed tubes extending from the chute along under the rear edges of the blades provided with outlet slots.

In testimony whereof, I affix my signature in presence of two witnesses.

JAMES HITCHINGS.

Witnesses:
J. E. BURNS,
CARRIE HITCHINGS.